United States Patent
Koyano

[11] Patent Number: 5,255,076
[45] Date of Patent: Oct. 19, 1993

[54] FLESH CORRECTION CIRCUIT AND METHOD OF FLESH CORRECTION

[75] Inventor: Atsushi Koyano, Itami, Japan

[73] Assignee: Mitsubishi Denki Kabushiki Kaisha, Tokyo, Japan

[21] Appl. No.: 896,620

[22] Filed: Jun. 10, 1992

[30] Foreign Application Priority Data

Nov. 25, 1991 [JP] Japan ................. 3-308945

[51] Int. Cl.$^5$ .............................. H04N 9/64
[52] U.S. Cl. ....................... 358/27; 358/28; 358/23
[58] Field of Search .............. 358/23, 25, 26, 27, 358/28, 40, 35, 10, 139

[56] References Cited

U.S. PATENT DOCUMENTS

| 4,051,510 | 9/1977 | Cochran | 358/28 |
| 4,306,247 | 12/1981 | Tomimoto | 358/28 |
| 4,327,374 | 4/1982 | Matsuda | 358/28 |
| 4,533,938 | 8/1985 | Hurst | 358/27 |
| 4,611,240 | 9/1986 | Harwood | 358/23 |

OTHER PUBLICATIONS

IEEE Transactions on Consumer Electronics, Feb. 1976, pp. 111–117, L. A. Harwood, "A Chrominance Demodulator IC with Dynamic Flesh Correction".

Primary Examiner—James J. Groody
Assistant Examiner—Sherrie Hsia
Attorney, Agent, or Firm—Oblon, Spivak, McClelland, Maier & Neustadt

[57] ABSTRACT

The present invention relates to a flesh correction circuit with a simple structure and a small size. A first I-axis demodulation circuit and a first O-axis demodulation circuit demodulate a chrominance signal using a first I-axis reference signal and a first Q-axis reference signal to generate a first I-axis demodulated signal and a first Q-axis demodulated signal, respectively. By multiplication of the two demodulated signals, a multiplier generates an original correction signal. Under the control of a selection switch, the original correction signal is allowed to serve as a correction signal as long as the first I-axis demodulated signal stays at a positive potential, or otherwise, the correction signal is fixed at a fixed potential. Via a low pass filter, the correction signal is supplied to a variable phase shifter which shifts a phase of the first I-axis reference signal by an amount which is determined according to the value of the correction signal, whereby a second I-axis reference signal is derived. Using the second I-axis reference signal, a second I-axis demodulation circuit demodulates the chrominance signal, generating a second I-axis demodulated signal. The selection switch also controls a period in which flesh correction is performed.

20 Claims, 9 Drawing Sheets

FIG. 4A PRIOR ART
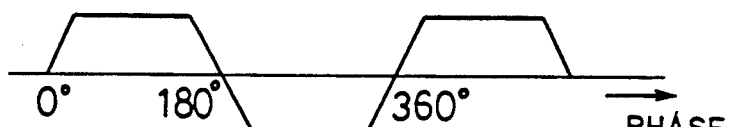
FIG. 4B PRIOR ART
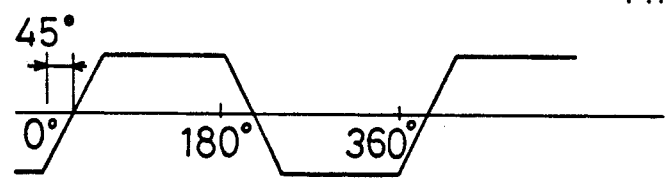
FIG. 4C PRIOR ART
FIG. 4D PRIOR ART
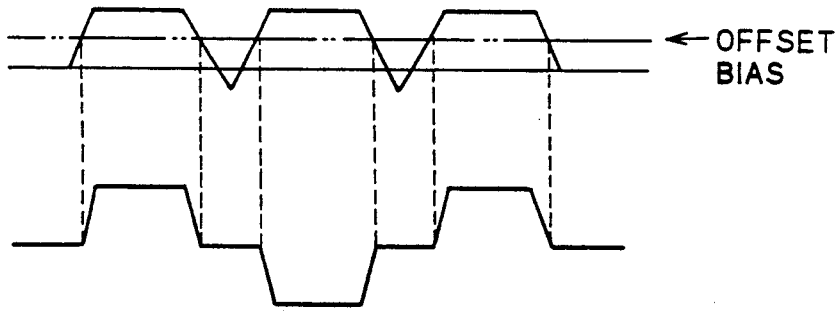

FLESH CORRECTION CIRCUIT AND METHOD OF FLESH CORRECTION

BACKGROUND OF THE INVENTION

1. Field of the Invention

The present invention relates to a circuit for correcting a skin color of a human being. The present invention also relates to a method of correcting a skin color of a human being.

2. Description of the Background Art

A chrominance demodulation circuit of a television receiver comprises a circuit for correcting a skin color of a human being, i.e., flesh correction circuit. Hues of a reproduced image picture differ between different broadcasting stations, between different programs provided by the same broadcasting station, and between broadcasting and reproduction on a VCR. Distortion in a transmission system including a cable also causes the hues to alter. The chrominance demodulation circuit automatically rectifies such deviation in hues on the basis of a flesh color.

Correction of a skin color of a human being (flesh color correction) will be described while referring to FIGS. 2 and 3. FIG. 2 shows how a phase difference between a chrominance signal and a demodulated reference signal relates to a reproduced color. The direction of an axis +I corresponds to a phase of a flesh color. If the chrominance signal has a large phase difference with the demodulated reference signal whose phase is in the direction of the axis +I, the chrominance signal is flesh-color corrected by reducing the phase difference, i.e., by phase-shifting the chrominance signal in the direction of an arced arrow toward the axis +I (phase correction). When a color to be demodulated is nearly a flesh color, only a small amount of the phase correction is necessary.

FIG. 3 shows how the phase difference between the chrominance signal and the demodulated reference signal is corrected. A subcarrier signal S as preliminarily phase-shifted is used as the demodulated reference signal whose phase is in the direction of the axis +I. In the description hereinafter, the subcarrier signal S and the demodulated reference signal will be regarded as the same unless identified as different. The subcarrier signal S is shown as a vector OA and a chrominance signal C is shown as a vector AB. In chrominance demodulation which does not require phase correction, a phase difference between the signals S and C is equal to an angle α.

A reference signal RS is derived in correspondence to the phase difference α between the signals S and C used for chrominance demodulation, a phase difference β between the reference signal RS and the chrominance signal C being smaller than the phase difference α. Hence, demodulation of the chrominance signal C using the reference signal RS is equivalent to phase correction of the chrominance signal C toward the axis +I. In other words, using a vector OB as the reference signal RS allows the phase difference β between the reference signal RS and the chrominance signal C to become smaller than the phase difference α.

FIG. 1 is a block diagram of a flesh correction circuit which is described in "A chrominance demodulator IC with dynamic flesh correction," IEEE Transaction on consumer electronics, 1976, pgs. 111-117. A chrominance signal C is received through a terminal 1 by a chrominance amplifier 5 where it is amplified, and given to a phase detector 10. Through a terminal 2, a subcarrier signal S is allowed to a hue adjusting circuit 6, and thence to the phase detector 10.

The chrominance signal C is given to a phase shifter 12 for phase-shifting a subcarrier signal, too, through a limiting amplifier 11. The phase shifter 12 also receives an output from the phase detector 10. An output from the phase shifter 12 is given to an adder 13 where it is added to the subcarrier signal S which has been given to the adder 13 through another limiting amplifier 11. As a result, a reference signal RS is generated. The reference signal RS is supplied to an I-axis demodulation circuit 7 without being phase-shifted and, via a 90-degree phase shifter 9, to a Q-axis demodulation circuit 8.

The I-axis demodulation circuit 7 and the Q-axis demodulation circuit 8 also receive the chrominance signal C and demodulate the same. The I-axis demodulation circuit 7 outputs an I-axis demodulated signal to a terminal 3. Likewise, the Q-axis demodulation circuit 8 outputs an Q-axis demodulated signal to a terminal 4.

The phase detector 10 multiplies the subcarrier signal S by the chrominance signal C. The subcarrier signal S is shown in FIG. 4A and the chrominance signal C is shown in FIG. 4B. As can be seen in FIGS. 4A and 4B, the chrominance signal C has a phase delay of 45 degrees with respect to the subcarrier signal S.

The phase detector 10 generates a signal as shown in FIG. 4C. The signal is supplied to the subcarrier phase shifter 12 where it is processed in such a manner that a potential smaller than a predetermined offset bias is eliminated. The signal thus processed gates the chrominance signal C supplied to the subcarrier phase shifter 12; that is, the subcarrier phase shifter 12 demodulates the chrominance signal C into a signal as shown in FIG. 4D and outputs the same to the adder 13.

The adder 13 adds the demodulated chrominance signal C to the subcarrier signal S, thereby the reference signal RS being derived which corresponds to the vector OB of FIG. 3. The larger the potential of the output signal from the subcarrier phase shifter 12 is, the larger a phase difference between the reference signal RS and the subcarrier signal S becomes. In other words, the smaller the potential the offset bias is, the less desirable the effect would be of the flesh correction where a phase difference between the subcarrier signal S and the chrominance signal C is large. The flesh correction should be limited to where the phase difference between the subcarrier signal S and the chrominance signal C is small to a certain extent. If all hues are skin-color corrected without exception, a reproduced image will have an unnatural tone.

Thus, the conventional flesh correction circuit includes a complicated system for detecting a phase difference between the subcarrier signal S and the chrominance signal C and generating the reference signal, and therefore, requires a large size.

SUMMARY OF THE INVENTION

A flesh correction method according to the present invention comprises the steps of: (a) generating a first I-axis reference signal and a first Q-axis reference signal from a subcarrier signal; (b) demodulating a chrominance signal using the first I-axis reference signal and the first Q-axis reference signal thereby generating a first I-axis demodulated signal and a first Q-axis demodulated signal, respectively; (c) processing the first I-axis demodulated signal and the first Q-axis demodulated signal through a computation process thereby generating an original correction signal; (d) processing the original correction signal in such a manner that the original correction signal is regarded as valid during a predetermined period in the first I-axis demodulated signal, thereby generating a correction signal; (e) correcting phases of the first I-axis reference signal and the first Q-axis reference signal by an amount which is determined under the control of the correction signal to generate a second I-axis reference signal and a second Q-axis reference signal; and (f) demodulating said chrominance signal using the second I-axis reference signal and the second Q-axis reference signal thereby generating a second I-axis demodulated signal and a second Q-axis demodulated signal, respectively.

In a preferred aspect of the present invention, the first I-axis reference signal is derived by phase-shifting the subcarrier signal; and the first Q-axis reference signal is derived by phase-shifting the first I-axis reference signal by 90 degrees.

In another preferred aspect of the method, the computation process is multiplication.

In another preferred aspect of the method, the step (d) comprises the steps of: (d-1) allowing the original correction signal to serve as the correction signal during a period in which the first I-axis demodulated signal stays at a potential equal to or higher than a predetermined bias potential; and (d-2) allowing the correction signal to be fixed at a predetermined fixed potential during a period in which the first I-axis demodulated signal stays at a potential lower than the predetermined bias potential.

In still another preferred aspect of the method, the bias potential is equal to or larger than a potential at a center point of the magnitude of the first I-axis demodulated signal.

In still another preferred aspect of the method, the fixed potential is equal to a potential at a center point of the magnitude of the correction signal.

In still another preferred aspect of the method, the step (d) further comprises the step of (d-3) removing a high frequency component from the correction signal.

In the step (e) in another preferred aspect of the method, the first I-axis reference signal is phase-shifted by an amount corresponding to a potential which is determined in accordance with the correction signal on the basis of the fixed potential.

In still another preferred aspect of the method, the step (e) comprises the steps of: (e-1) phase-shifting the first I-axis reference signal so that the first I-axis reference signal has a phase lead of 45 degrees, whereby an I-axis leading waveform is generated; (e-2) phase-shifting the first I-axis referency signal so that the first I-axis reference signal has a phase delay of 45 degrees, whereby an I-axis delaying waveform is generated; and (e-3) synthesizing the I-axis leading waveform and the I-axis delaying waveform in a ratio which is determined in accordance with the amount of phase correction, whereby the second I-axis reference signal is generated.

In still another preferred aspect of the method, the step (e) further comprises the steps of: (e-4) phase-shifting the first Q-axis reference signal so that the first Q-axis reference signal has a phase lead of 45 degrees, whereby a Q-axis leading waveform is generated; (e-5) phase-shifting the first Q-axis reference signal so that the first Q-axis reference signal has a phase delay of 45 degrees, whereby a Q-axis delaying waveform is generated; and (e-6) synthesizing the Q-axis leading waveform and the Q-axis delaying waveform in a ratio which is determined in accordance with the amount of phase correction, whereby the second Q-axis reference signal is generated.

The present invention also relates to a flesh correction circuit. The skin color correction circuit of the present invention comprises: a first terminal at which a subcarrier signal is inputted; a second terminal at which a chrominance signal is inputted; a fixed phase shifter for generating a first I-axis reference signal and a first Q-axis reference signal from the chrominance signal; a first I-axis demodulation circuit for demodulating the chrominance signal using the first I-axis reference signal and generating a first I-axis demodulated signal; a first Q-axis demodulation circuit for demodulating the chrominance signal using the first Q-axis reference signal and generating a first Q-axis demodulated signal; a computation circuit for processing the first I-axis demodulated signal and the first Q-axis demodulated signal through a computation process and generating an original correction signal; a signal generating circuit for processing the original correction signal in such a manner that the original correction signal is regarded as valid during a predetermined period in the first I-axis demodulated signal, thereby generating a correction signal; a variable phase shifter for correcting phases of the first I-axis reference signal and the first Q-axis reference signal by an amount which is determined under the control of the correction signal to generate a second I-axis reference signal and a second Q-axis reference signal; a second I-axis demodulation circuit for demodulating the chrominance signal using the second I-axis reference signal and generating a second I-axis demodulated signal; and a second Q-axis demodulation circuit for demodulating the chrominance signal using the second Q-axis reference signal and generating a second Q-axis demodulated signal.

In a preferred aspect, the fixed phase shifter generates the first I-axis reference signal by allowing the subcarrier signal as it is to serve as the first I-axis reference signal and generates the first Q-axis reference signal by phase-shifting the subcarrier signal by 90 degrees.

In another preferred aspect, the computation circuit is a multiplier.

In still another preferred aspect, the signal generating circuit allows the original correction signal to serve as the correction signal during a period in which the first I-axis demodulated signal stays at a potential equal to or higher than a predetermined bias potential but requires the correction signal to be fixed at a predetermined fixed potential during a period in which the first I-axis demodulated signal stays at a potential lower than the predetermined bias potential.

In still another preferred aspect, the predetermined bias potential is equal to or larger than a potential at a center point of the magnitude of the first I-axis demodulated signal.

In still another preferred aspect, the fixed potential is equal to a potential at a center point of the magnitude of the correction signal.

In still another preferred aspect, the signal generating comprises a low pass filter.

In another preferred aspect, the variable phase shifter phase-shifts the first I-axis reference signal by an amount corresponding to a potential which is determined in accordance with the correction signal on the basis of said fixed potential.

In another preferred aspect, the variable phase shifter comprises: a 45-degree phase shifting circuit for phase-shifting the first I-axis reference signal so that the first I-axis reference signal has a phase lead of 45 degrees thereby to generate an I-axis leading waveform and phase-shifting the first I-axis reference signal so that the first I-axis reference signal has a phase delay of 45 degrees thereby to generate an I-axis delaying waveform; and a synthesizing circuit for synthesizing the I-axis leading waveform and the I-axis delaying waveform in a ratio which is determined in accordance with the amount of phase correction, whereby the second I-axis reference signal is generated.

In another preferred aspect, the variable phase shifter further comprises: a 45-degree phase shifting circuit for phase-shifting the first Q-axis reference signal so that the first Q-axis reference signal has a phase lead of 45 degrees thereby to generate a Q-axis leading waveform and phase-shifting the first Q-axis reference signal so that the first Q-axis reference signal has a phase delay of 45 degrees thereby to generate a Q-axis delaying waveform; and a synthesizing circuit for synthesizing the Q-axis leading waveform and the Q-axis delaying waveform in a ratio which is determined in accordance with the amount of phase correction, whereby the second Q-axis reference signal is generated.

According to the present invention, the correction signal corrects the phase of the first I-axis reference signal during a predetermined period in which the first I-axis demodulated signal remains in a certain state. As a result, the second I-axis reference signal is generated, thereby a phase difference between the chrominance signal and the signal which serves as a reference signal in demodulation. The correction signal is generated by processing the first I-axis demodulated signal and the first Q-axis demodulated signal through computation process.

Thus, the signal which serves as a reference signal in demodulation is phase-shifted by the output signal which is generated by multiplying the I-axis demodulated signal by the Q-axis demodulated signal, whereby a new reference signal is derived. Using the new reference signal, the chrominance signal is demodulated. Hence, the skin color correction circuit of the present invention has a simple structure and a reduced size, and therefore, is easy to design.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4D are explanatory diagrams showing the conventional flesh correction technique;

DESCRIPTION OF THE PREFERRED EMBODIMENTS

Figure 1:
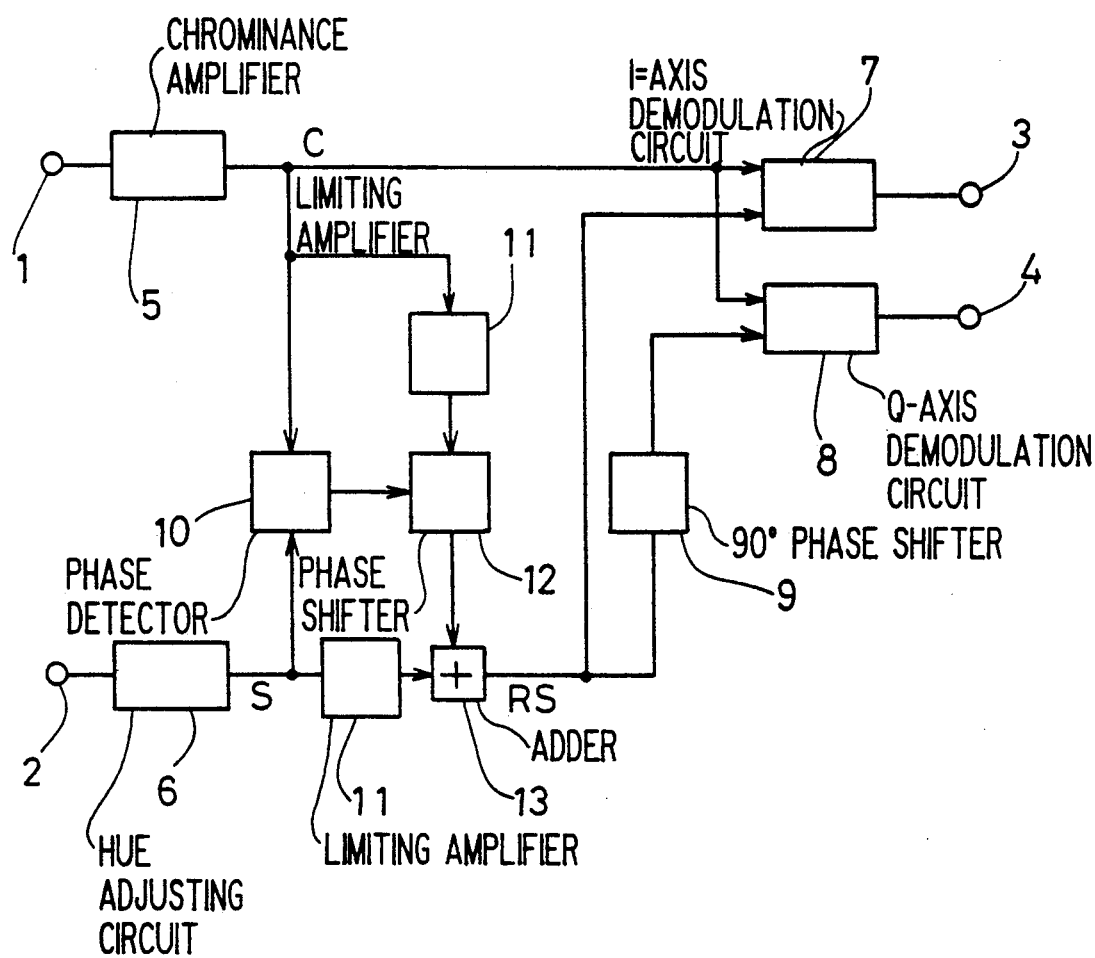
FIG. 1 is a block diagram showing conventional flesh correction technique.
Figure 2:
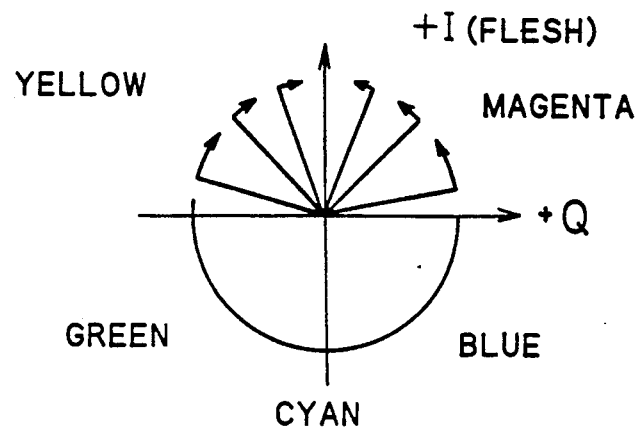
FIGS. 2 and 3 are vector diagrams showing the principles of flesh correction.
Figure 3:
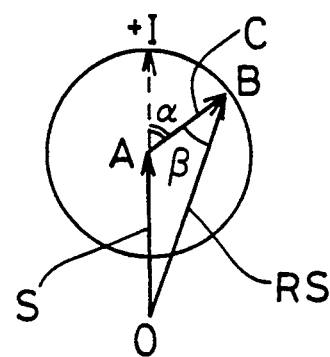
Figure 5:
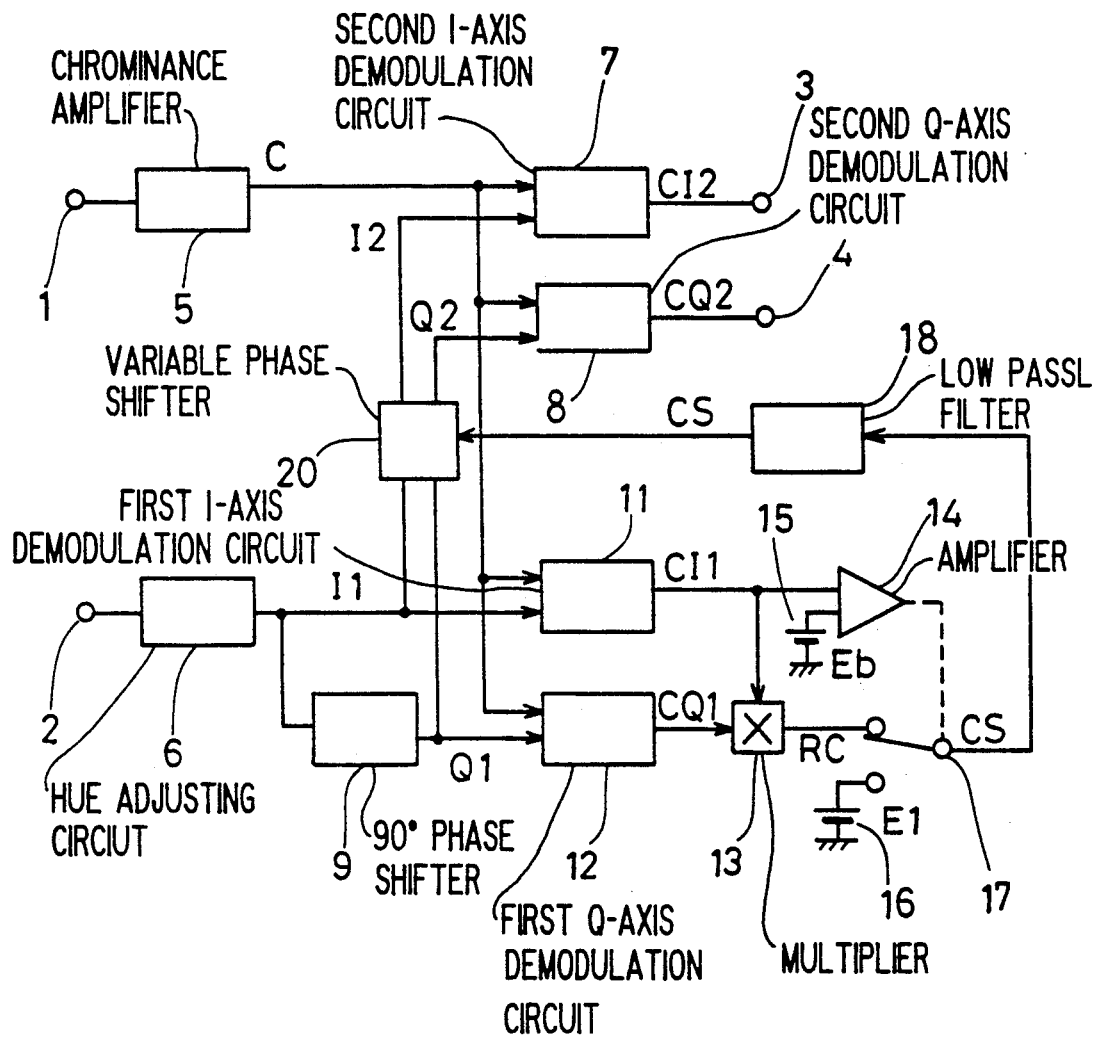
FIG. 5 is a block diagram showing a first preferred embodiment of the present invention.

FIG. 5 is a block diagram illustrating a first preferred embodiment of the present invention. A chrominance amplifier 5 has an input terminal connected to a terminal 1 at which a chrominance signal C is inputted. An output terminal of the chrominance amplifier 5 is connected to input terminals of a first I-axis demodulation circuit 11, a second I-axis demodulation circuit 7, a first Q-axis demodulation circuit 12 and a second Q-axis demodulation circuit 8. For simplicity of explanation, the chrominance signal C as amplified and the chrominance signal C as not amplified at the chrominance amplifier 5 will be regarded as the same in the description hereinafter. An input terminal of a hue adjusting circuit 6 is connected to a terminal 2 at which a subcarrier signal S is inputted. The subcarrier signal S transmitted to the hue adjusting circuit 6 is phase-shifted thereat, whereby a first I-axis reference signal I1 is generated.

An output terminal of the hue adjusting circuit 6 is connected to a variable phase shifter 20 and the first I-axis demodulation circuit 11. The first I-axis reference signal I1 is supplied from the hue adjusting circuit 6 to the variable phase shifter 20 and the first I-axis demodulation circuit 11. A 90-degree phase shifter 9 is likewise connected to the output terminal of the hue adjusting circuit 6 so as to receive the first I-axis reference signal I1. Phase-shifted by 90 degrees at the 90-degree phase shifter 9, the first I-axis reference signal I1 is converted into a first Q-axis reference signal Q1 and supplied to the variable phase shifter 20 and the first Q-axis demodulation circuit 12.

The first I-axis demodulation circuit 11 and the first Q-axis demodulation circuit 12 demodulate the chrominance signal C using the first I-axis reference signal I1 and the first Q-axis reference signal Q1, and output a first I-axis demodulated signal CI1 and a first Q-axis demodulated signal CQ1, respectively. The first I-axis demodulated signal CI1 and the first Q-axis demodulated signal CQ1 are supplied to a multiplier 13 where they are multiplied up and converted into an original correction signal RC. A selection switch 17 includes two receiving terminals, one for receiving the original correction signal RC and the other for receiving a fixed potential E1 from a power source 16. A correction signal CS is obtained at a common terminal of the selection switch 17 by switching from the one terminal receiving the original correction signal RC to the other receiving the fixed potential E1 or vice versa under the control of an output signal from an amplifier 14 which receives the first I-axis demodulated signal CI1 and a bias potential Eb from a power source 15.

The correction signal CS is supplied to the variable phase shifter 20 through a low pass filter 18. Although different, the correction signal CS before being output to the low pass filter 18 and the correction signal CS as filtered by the low pass filter 18 will be treated as the same for simplicity of explanation. The variable phase shifter 20 phase-shifts the first I-axis reference signal I1 and the first Q-axis reference signal Q1 under the control of the correction signal CS so that a second I-axis reference signal I2 and a second Q-axis reference signal Q2 are obtained, respectively.

The second I-axis reference signal I2 and a second Q-axis reference signal Q2 are supplied to the second Q-axis demodulation circuit 7 and the second Q-axis demodulation circuit 8, respectively. Using the second I-axis reference signal I2 and the second Q-axis reference signal Q2, the second I-axis demodulation circuit 7 and the second Q-axis demodulation circuit 8 demodulate the chrominance signal C. As a result, a second I-axis demodulated signal CI2 and a second Q-axis demodulated signal CQ2 are generated and outputted to terminals 3 and 4, respectively.

Figure 6A:
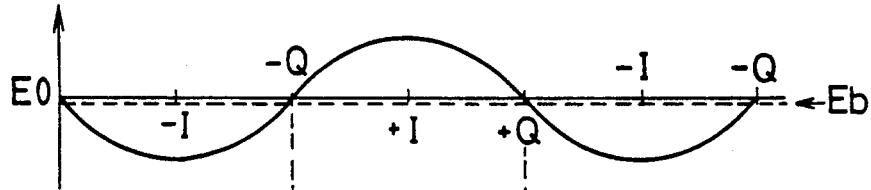
FIGS. 6A to 6D are graphs showing the first preferred embodiment of the present invention.
Figure 6B:
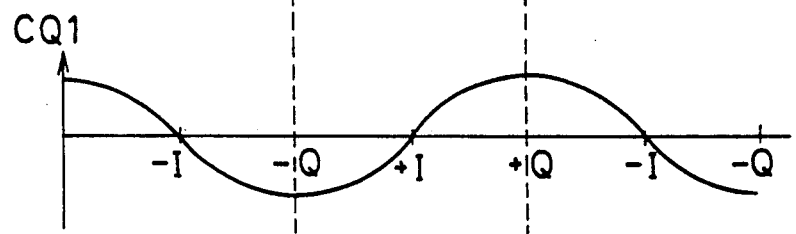
Figure 6C:
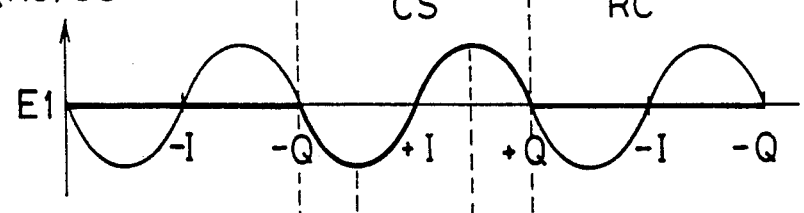

Now, specific steps of the signal processing will be described. FIGS. 6A to 6C are graphs each plotting potential of the first I-axis demodulated signal CI1, the first Q-axis demodulated signal CQ1, the original correction signal RS and the correction signal CS against phase of the chrominance signal C with respect to the axes I and Q. At the points +I, −I, +Q and −Q on the horizontal axis, phases of the respective signals are precisely in the directions of the axis +I, the axis −I, the axis +Q and the axis −Q, respectively.

Figure 6D:
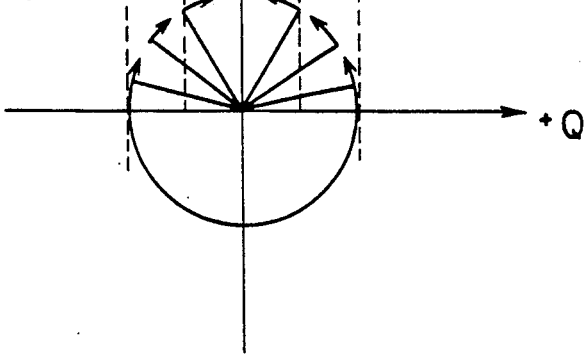
Figure 7A:
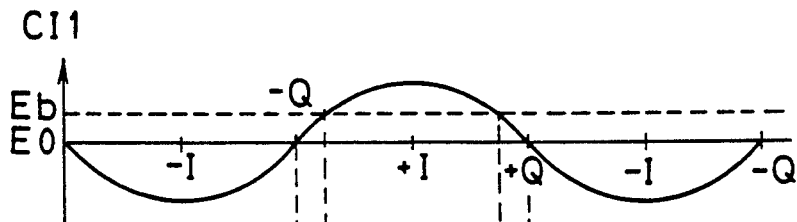
FIGS. 7A to 7D are graphs showing a second preferred embodiment of the present invention.
Figure 7B:
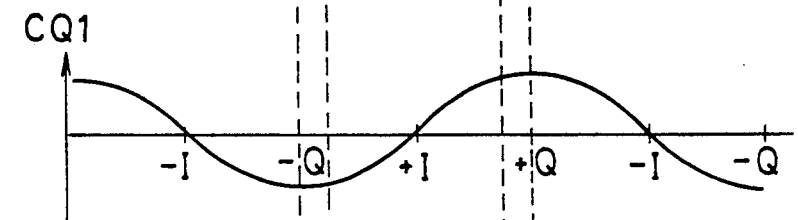
Figure 7C:
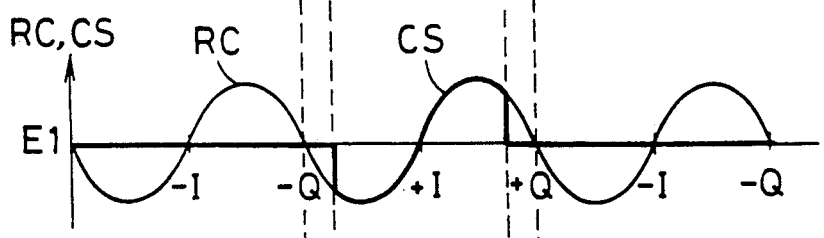
Figure 7D:
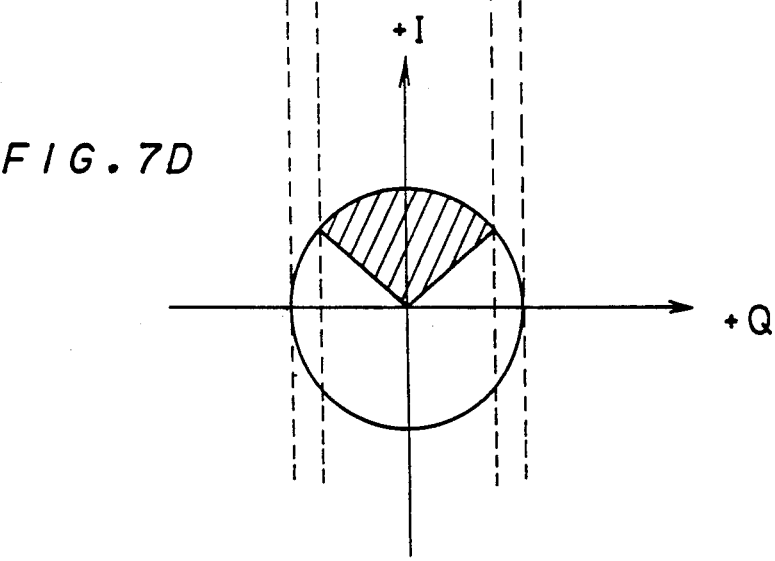

FIG. 6D is a graph of a radius vector as obtained by synthesizing vectors of the first I-axis demodulated signal CI1 and the first Q-axis demodulated signal CQ1 assuming that the magnitudes of the first I-axis demodulated signal CI1 and the first Q-axis demodulated signal CQ1 are the same constant. In the graph, each arced arrow shows a direction toward which the first I-axis demodulated signal CI1 and the first Q-axis demodulated signal CQ1 are phase-shifted for flesh correction. Although the flesh correction is achieved by phase-shifting the second I-axis reference signal I2, which serves as a reference in demodulation, with respect to the first I-axis reference signal I1, the graph shows a phase of the second I-axis reference signal I2 as coinciding with a phase of the first I-axis reference signal I1.

The first I-axis demodulated signal CI1 is expressed as a sinusoidal waveform. At a center point of the magnitude of the waveform, a potential value is E0 (central potential value). The maximum potential value of the first I-axis demodulated signal CI1 is reached when a phase of the first I-axis reference signal I1 is in the direction of the axis +I while the minimum potential value is reached when a phase of the first I-axis reference signal I1 is in the direction of the axis −I. The first Q-axis demodulated signal CQ1 is also expressed as a sinusoidal waveform with a central potential value of E0. The maximum potential value of the first Q-axis demodulated signal CQ1 is reached when a phase of the first I-axis reference signal I1 is in the direction of the axis +Q while the minimum potential value is reached when a phase of the first I-axis reference signal I1 is in the direction of the axis −Q. Hence, the original correction signal RC, which is a multiplication product of the signals CI1 and CQ1, is a sinusoidal waveform denoted by a thin line in FIG. 6C.

Now, assume that the bias potential Eb to be impressed on the amplifier 14 (FIG. 5) is equal to the central potential value E0 of the waveform of the first I-axis reference signal I1. In FIG. 6A, although the bias potential value Eb is shown as smaller than the central potential value E0 of the first I-axis reference signal I1 for clarity of illustration (dotted line), the bias potential value Eb is larger than the central potential value E0 of the first I-axis reference signal I1. This is because excessive flesh correction would deteriorate the color tone of a demodulated image.

As long as the potential of the first I-axis demodulated signal CI1 stays equal to or longer than the bias potential Eb, the selection switch 17 transmits the original correction signal RC to the low pass filter 18 (FIG. 5) as the correction signal CS. In FIG. 6C, the correction signal CS is denoted by a bold line. During this period, the correction signal CS coincides with the original correction signal RS (FIG. 6C, thin line).

On the other hand, while the potential of the first I-axis demodulated signal CI1 stays smaller than the bias potential Eb, the receiving terminal for receiving the fixed potential E1 is connected to the common terminal. This enables the potential of the correction signal CS to be fixed at the fixed potential E1 supplied from the power source 16 (FIG. 5), the fixed potential E1 being equal to a central potential value of the original correction signal RC.

Thus, the correction signal CS permits the variable phase shifter 20 to be provided with a multiplication product of the first I-axis demodulated signal CI1 and the first Q-axis demodulated signal CQ1 only when the flesh correction is needed or otherwise provided with the fixed potential E1. This signal processing is possible in the base bend.

The flesh correction is not always necessary even when the potential of the first I-axis demodulated signal CI1 is equal to or larger than the central potential value E0. FIGS. 7A to 7D show a second preferred embodiment of the present invention where the flesh correction is done only when a radius vector obtained by synthesizing the first I-axis demodulated signal CI1 and the first Q-axis demodulated signal CQ1 is near the axis +I to a certain extent (i.e., when the radius vector is within the hatched area in FIG. 7D). In the second preferred embodiment, the first I-axis demodulated signal CI1 and the first Q-axis demodulated signal CQ1 are the same as the corresponding signals of the first preferred embodiment. So is an original correction signal RC of the second preferred embodiment. However, a correction signal CS differs from the correction signal CS of the first preferred embodiment since the second preferred embodiment requires that a bias potential Eb is larger than a central potential value E0. In other words, the flesh correction is not always required even when the first I-axis demodulated signal CI1 is equal to or larger than the central potential value E0.

Thus, by changing the bias potential Eb, the flesh correction circuit of the present invention controls which hue to be automatically flesh-color corrected.

The flesh correction must not result in that a demodulated image appears unnatural to human eyes. Hence, the low pass filter 18 is employed to remove noise in the correction signal CS so that an abrupt change in the waveform of the correction signal CS is moderated.

Next, a process will be described in which the first I-axis reference signal I1 is phase-shifted using the correction signal CS thereby reducing a phase difference between the first I-axis reference signal I1 and the chrominance signal C.

Figure 8:
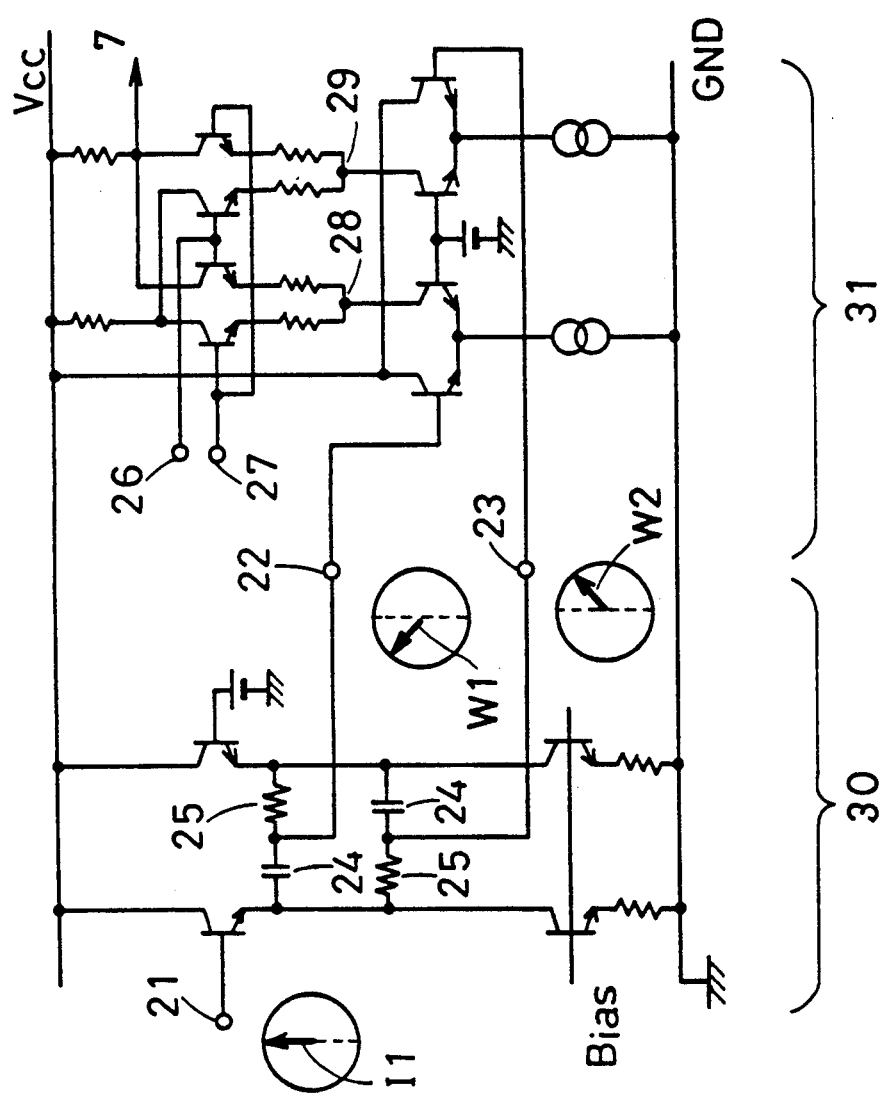
FIG. 8 is a circuitry diagram partially showing inner structure of a variable phase shifter.

FIG. 8 is a circuitry diagram partially showing the variable phase shifter 20 for realizing the process above. FIG. 8 shows only a circuit for processing the first I-axis reference signal I1. A circuit for processing the first Q-axis reference signal Q1 has a structure similar to the circuit of FIG. 8. That is, the variable phase shifter 20 includes the circuit shown in FIG. 8 and a circuit similar to the same.

The circuit of FIG. 8 is roughly divided into a first-step portion, i.e., a 45-degree phase shifter 30 and a second-step portion, i.e., a synthesizing circuit 31.

The 45-degree phase shifter 30 comprises an input terminal 21, capacitors 24 and resistors 25. Receiving the first I-axis reference signal I1 through the input terminal 21, the capacitor 24 and the resistor 25 advances and delays a phase of the first I-axis reference signal I1 by a predetermined amount (45 degrees) so that a leading waveform W1 and a delaying waveform W2 are obtained at terminals 22 and 23, respectively. The leading waveform W1 has a phase lead of 45 degrees with respect to the first I-axis reference signal I1 and the delaying waveform W2 has a phase delay of 45 degrees to the first I-axis reference signal I1. In magnitude, the leading waveform W1 and the delaying waveform W2 are equal to each other. For better understanding, FIG. 8 includes vector diagrams beside the input terminal 21 and the terminals 22 and 23. The vector diagrams show a relation between phases of the first I-axis reference signal I1 and the waveforms W1 and W2.

The synthesizing circuit 31 synthesizes the leading waveform W1 and the delaying waveform W2 and generates the second I-axis reference signal I2 which is phase-shifted by an amount determined on the basis of a phase of the first I-axis reference signal I1. The second I-axis reference signal I2 is then supplied to the second I-axis demodulation circuit 7. The amount the second I-axis reference signal I2 is to be phase-shifted varies depending on a potential difference between voltages impressed on terminals 26 and 27. The terminals 27 and 26 receive the correction signal CS and the signal whose waveform is equal in magnitude but symmetric around the fixed potential E1 to that of the correction signal CS.

Figure 9:
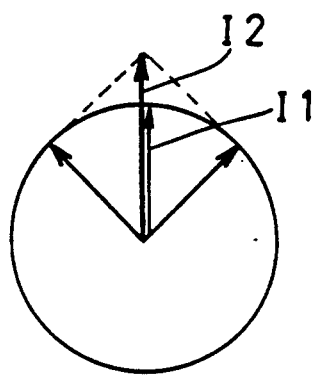
FIGS. 9 to 11 are vector diagrams showing how a second I-axis reference signal I2 is synthesized.

Since the correction signal waveform remains at the fixed potential E1 at all times when the flesh correction is not performed, the voltages at the terminals 26 and 27 are equal. Hence, current at a junction point 28 due to the leading waveform W1 is equal to current at a junction point 29 due to the delaying waveform W2. As a result, the second I-axis reference signal I2 outputted to the second I-axis demodulation circuit 7 has the same phase as the first I-axis reference signal I1 (FIG. 9).

On the other hand, in flesh correction operations, how large phase lead and phase delay the second I-axis reference signal I2 must have with respect to the first I-axis reference signal I1 is determined by a difference between a potential of the correction signal CS and the fixed potential E1. When a potential of the first Q-axis demodulated signal CQ1 is smaller than the central potential value of itself, a phase of the second I-axis reference signal I2 is advanced with respect to that of the first I-axis reference signal I1. In this case, since a potential of the correction signal CS is smaller than the fixed potential E1, a potential at the terminal 26 exceeds that at the terminal 27.

Figure 10:
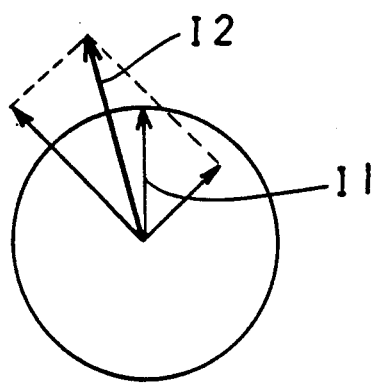

In response, current at the junction point 28 exceeds current at the junction point 29. Hence, an output component of the second I-axis reference signal I2 related to the leading waveform W1 becomes large while an output component of the second I-axis reference signal I2 related to the delaying waveform W2 becomes small, thereby the second I-axis reference signal I2 having a phase lead with respect to the first I-axis reference signal I1 (FIG. 10).

Figure 11:
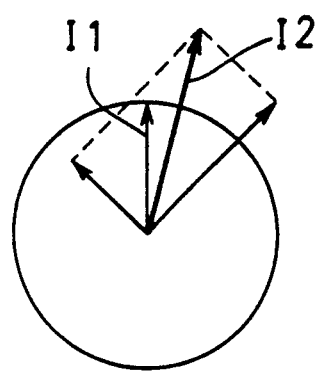

On the other hand, when a potential of the first Q-axis demodulated signal CQ1 is smaller than the central potential value of itself, a phase of the second I-axis reference signal I2 is delayed with respect to that of the first I-axis reference signal I1. In this case, an output component of the second I-axis reference signal I2 related to the leading waveform W1 becomes small while an output component of the second I-axis reference signal I2 related to the delaying waveform W2 becomes large. As a result, the second I-axis reference signal I2 has a phase delay with respect to the first I-axis reference signal I1 (FIG. 11).

Figure 12:
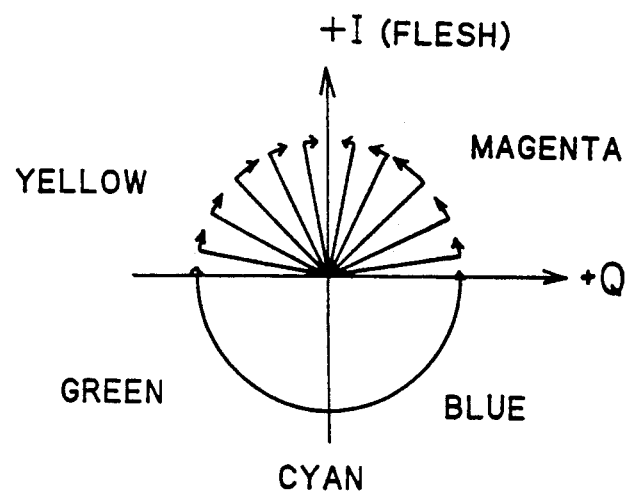
FIG. 12 is a vector diagram illustrating skin color correction according to the present invention.

The absolute value of the phase correction amount monotonously increases with an increase in the absolute value of a difference between a potential of the correction signal CS and the fixed potential E1. Hence, if the correction signal CS has a waveform as shown in FIG. 6C, the absolute value of the phase correction amount is zero when a radius vector obtained by synthesizing the first I-axis demodulated signal CI1 and the first Q-axis demodulated signal CQ1 coincides with the axes +I, +Q, −I or −Q. The absolute value of the phase correction amount reaches its maximum when the radius vector obtained by synthesizing the first I-axis demodulated signal CI1 and the first Q-axis demodulated signal CQ1 is out of phase by 45 degrees with the axis +I (FIG. 12).

Although the description above relates only to phase shifting process for generating the second I-axis reference signal I2 and omits description about phase shifting process for generating the second Q-axis reference signal Q2, the second Q-axis reference signal Q2 is derived in a similar manner so that the second I-axis reference signal I2 and the second Q-axis reference signal Q2 are out of phase by 90 degrees with respect to each other.

The second I-axis demodulation circuit 7 and the second Q-axis demodulation circuit 8 demodulate the chrominance signal C using the second I-axis reference signal I2 and the second Q-axis reference signal Q2, respectively. Consequently, the second I-axis demodulated signal CI2 and the second Q-axis demodulated signal CQ2 as flesh-color corrected are generated and given to the terminals 3 and 4, respectively.

While the invention has been shown and described in detail, the foregoing description is in all aspects illustrative and not restrictive. It is understood that numerous modifications and variations can be devised without departing from the scope of the invention.

I claim:

1. A flesh correction method, comprising the steps of:
   (a) generating a first I-axis reference signal and a first Q-axis reference signal from a subcarrier signal;
   (b) demodulating a chrominance signal using said first I-axis reference signal and said first Q-axis reference signal thereby generating a first I-axis demodulated signal and a first Q-axis demodulated signal, respectively;
   (c) processing said first I-axis demodulated signal and said first Q-axis demodulated signal through a computation process thereby generating an original correction signal;
   (d) processing said original correction signal in such a manner that said original correction signal is regarded as valid during a predetermined period in said first I-axis demodulated signal, thereby generating a correction signal;

(e) correcting phases of said first I-axis reference signal and said first Q-axis reference signal by an amount which is determined under the control of said correction signal to generate a second I-axis reference signal and a second Q-axis reference signal; and (f) demodulating said chrominance signal using said second I-axis reference signal and said second Q-axis reference signal thereby generating a second I-axis demodulated signal and a second Q-axis demodulated signal, respectively.

2. A method of claim 1, wherein
said first I-axis reference signal is derived by phase-shifting said subcarrier signal; and
said first Q-axis reference signal is derived by phase-shifting said first I-axis reference signal by 90 degrees.

3. A method of claim 1 wherein said computation process is multiplication.

4. A method of claim 1 wherein said step (d) comprises the steps of:
(d-1) allowing said original correction signal to serve as said correction signal during a period in which said first I-axis demodulated signal stays at a potential equal to or higher than a predetermined bias potential; and
(d-2) allowing said correction signal to be fixed at a predetermined fixed potential during a period in which said first I-axis demodulated signal stays at a potential lower than said predetermined bias potential.

5. A method of claim 4 wherein said bias potential is equal to or larger than a potential at a center point of the magnitude of said first I-axis demodulated signal.

6. A method of claim 5 wherein said fixed potential is equal to a potential at a center point of the magnitude of said original correction signal.

7. A method of claim 4 wherein said step (d) further comprises the step of (d-3) removing a high frequency component from said correction signal.

8. A method of claim 4 wherein, in said step (e), said first I-axis reference signal is phase-shifted by an amount corresponding to a potential which is determined in accordance with said correction signal on the basis of said fixed potential.

9. A method of claim 1, wherein said step (e) comprises the steps of:
(e-1) phase-shifting said first I-axis reference signal so that said first I-axis reference signal has a phase lead of 45 degrees, whereby an I-axis leading waveform is generated;
(e-2) phase-shifting said first I-axis reference signal so that said first I-axis reference signal has a phase delay of 45 degrees, whereby an I-axis delaying waveform is generated; and
(e-3) synthesizing said I-axis leading waveform and said I-axis delaying waveform in a ratio which is determined in accordance with said amount of phase correction, whereby said second I-axis reference signal is generated.

10. A method of claim 9, wherein said step (e) further comprises the steps of:
(e-4) phase-shifting said first Q-axis reference signal so that said first Q-axis reference signal has a phase lead of 45 degrees, whereby a Q-axis leading waveform is generated;
(e-5) phase-shifting said first Q-axis reference signal so that said first Q-axis reference signal has a phase delay of 45 degrees, whereby a Q-axis delaying waveform is generated; and
(e-6) synthesizing said Q-axis leading waveform and said Q-axis delaying waveform in a ratio which is determined in accordance with said amount of phase correction, whereby said second Q-axis reference signal is generated.

11. A flesh correction circuit, comprising:
a first terminal at which a subcarrier signal is inputted;
a second terminal at which a chrominance signal is inputted;
a fixed phase shifter for generating a first I-axis reference signal and a first Q-axis reference signal from said subcarrier signal;
a first I-axis demodulation circuit for demodulating said chrominance signal using said first I-axis reference signal and generating a first I-axis demodulated signal;
a first Q-axis demodulation circuit for demodulating said chrominance signal using said first Q-axis reference signal and generating a first Q-axis demodulated signal;
a computation circuit for processing said first I-axis demodulated signal and said first Q-axis demodulated signal through a computation process and generating an original correction signal;
a signal generating circuit for processing said original correction signal in such a manner that said original correction signal is regarded as valid during a predetermined period in said first I-axis demodulated signal, thereby generating a correction signal;
a variable phase shifter for correcting phases of said first I-axis reference signal and said first Q-axis reference signal by an amount which is determined under the control of said correction signal to generate a second I-axis reference signal and a second Q-axis reference signal;
a second I-axis demodulation circuit for demodulating said chrominance signal using said second I-axis reference signal and generating a second I-axis demodulated signal; and
a second Q-axis demodulation circuit for demodulating said chrominance signal using said second Q-axis reference signal and generating a second Q-axis demodulated signal.

12. A circuit of claim 11 wherein said fixed phase shifter generates said first I-axis reference signal by phase-shifting said subcarrier signal by a predetermined amount and generates said first Q-axis reference signal by phase-shifting said subcarrier signal by the sum of 90 degrees plus said predetermined amount.

13. A circuit of claim 11 wherein said computation circuit is a multiplier.

14. A circuit of claim 11 wherein said signal generating circuit allows said original correction signal to serve as said correction signal during a period in which said first I-axis demodulated signal stays at a potential equal to or higher than a predetermined bias potential but requires said correction signal to be fixed at a predetermined fixed potential during a period in which said first I-axis demodulated signal stays at a potential lower than said predetermined bias potential.

15. A circuit of claim 14 wherein said predetermined bias potential is equal to or larger than a potential at a center point of the magnitude of said first I-axis demodulated signal.

16. A circuit of claim 15 wherein said fixed potential is equal to a potential at a center point of the magnitude of said original correction signal.

17. A circuit of claim 14 wherein said signal generating circuit comprises a low pass filter.

18. A circuit of claim 14 wherein said variable phase shifter phase-shifts said first I-axis reference signal by an amount corresponding to a potential which is determined in accordance with said correction signal on the basis of said fixed potential.

19. A circuit of claim 11, wherein said variable phase shifter comprises:
- a 45-degree phase shifting circuit for phase-shifting said first I-axis reference signal so that said first I-axis reference signal has a phase lead of 45 degrees thereby to generate an I-axis leading waveform and phase-shifting said first I-axis reference signal so that said first I-axis reference signal has a phase delay of 45 degrees thereby to generate an I-axis delaying waveform; and
- a synthesizing circuit for synthesizing said I-axis leading waveform and said I-axis delaying waveform in a ratio which is determined in accordance with said amount of phase correction, whereby said second I-axis reference signal is generated.

20. A circuit of claim 19 wherein said variable phase shifter further comprises:
- a 45-degree phase shifting circuit for phase-shifting said first Q-axis reference signal so that said first Q-axis reference signal has a phase lead of 45 degrees thereby to generate a Q-axis leading waveform and phase-shifting said first Q-axis reference signal so that said first Q-axis reference signal has a phase delay of 45 degrees thereby to generate a Q-axis delaying waveform; and
- a synthesizing circuit for synthesizing said Q-axis leading waveform and said Q-axis delaying waveform in a ratio which is determined in accordance with said amount of phase correction, whereby said second Q-axis reference signal is generated.

* * * * *